United States Patent [19]
DiMarcello et al.

[11] Patent Number: 5,928,574
[45] Date of Patent: Jul. 27, 1999

[54] METHOD OF MAKING OPTICAL FIBER

[75] Inventors: Frank Vincent DiMarcello, Annandale; Richard Garner Huff, Califon; Karen S. Kranz, Middlesex; Frederick W. Walz, Jr., Plainfield, all of N.J.

[73] Assignee: Lucent Technologies Inc., Murray Hill, N.J.

[21] Appl. No.: 09/065,936

[22] Filed: Apr. 24, 1998

[51] Int. Cl.$^6$ .......................... B29D 11/00; C03B 37/027
[52] U.S. Cl. .............................. 264/1.24; 65/434; 65/435; 264/1.1
[58] Field of Search ..................... 264/1.1, 1.21, 264/1.24, 1.29, 237; 425/445; 65/434, 435

[56] References Cited

U.S. PATENT DOCUMENTS

| | | | |
|---|---|---|---|
| 4,126,436 | 11/1978 | Bailey | 65/434 |
| 4,547,644 | 10/1985 | Bair et al. | 65/435 |
| 4,761,168 | 8/1988 | Blyler, Jr. | |
| 5,160,359 | 11/1992 | Strackenbrock et al. | 65/434 |
| 5,284,499 | 2/1994 | Harvey et al. | |

FOREIGN PATENT DOCUMENTS

| | | | |
|---|---|---|---|
| 6-219767 | 8/1994 | Japan | 65/435 |
| 2 111 898 | 7/1983 | United Kingdom | 264/1.29 |

*Primary Examiner*—Mathieu D. Vargot
*Attorney, Agent, or Firm*—Eugen E. Pacher

[57] ABSTRACT

Fiber bow makes mass fusion splicing of optical fiber difficult and this is undesirable. We have found that fiber bow can be significantly reduced if the fiber that is being drawn from a heated optical fiber preform is caused to run through a tubular cooling chamber that extends from the draw furnace, the cooling chamber comprising a tube of inner diameter $d_1 < 35$ mm, preferably <20 mm. In a preferred embodiment the cooling chamber includes an upper cooling chamber of inner diameter $d_2 > d_1$, with a transition element providing a smooth transition between the two chambers. The cooling chamber desirably is free of turbulence-causing air leaks and/or geometrical features.

9 Claims, 3 Drawing Sheets

○ 20m TOWER-UPPER COOLING CHAMBER+TRANSISTION+78" LOWER COOLING CHAMBER
△ 9m TOWER-UPPER COOLING CHAMBER+TRANSITION+9" LOWER COOLING CHAMBER

METHOD OF MAKING OPTICAL FIBER

FIELD OF THE INVENTION

This invention pertains to methods of making optical fiber, in particular, optical fiber having low fiber bow.

BACKGROUND

Optical fiber has reached a high degree of development. However, some shortcomings remain in at least some fibers. Among these is a condition frequently referred to as "curl" or fiber "bow". See, for instance, U.S. Pat. No. 5, 284,499.

As described in the '499 patent, ". . . differential cooling of a drawn fiber before the viscosity of the cladding layer of the fiber is high enough to substantially prevent differential stresses in the drawn fiber may cause the fiber to bend. This bending, or fiber "bow", causes difficulty when the fiber is spliced to other fibers, resulting in high loss splices . . . ". The problem is most severe in mass fusion splices.

Fiber bow is usually expressed in terms of a deflection, or in terms of a radius of curvature. It can be measured by extending a short length (e.g., 18.9 mm) of uncoated fiber beyond a restraining fixture, rotating the fiber, and measuring the maximum deflection of the fiber end. The deflection measurement can, if desired, be converted into a radius of curvature using the approximate expression $R=l^2/2\delta$, where R is the radius of curvature, l is the length of fiber extending from the fixture, and $\delta$ is the fiber deflection, all in meters.

The '499 patent discloses apparatus for drawing optical fiber having reduced bow but does not disclose values of bow obtained by means of the apparatus. We have carried out experiments and have obtained bow of 10–20 $\mu$m with apparatus of the type shown in '499.

In view of the importance of having fiber with low bow, it would be desirable to have available a method of making such fiber (e.g., a method of making fiber having a mean bow of 5 $\mu$m or less). This application discloses such a method.

SUMMARY OF THE INVENTION

In a broad aspect the invention is embodied in a method of making optical fiber having relatively low bow, exemplarily a mean value of 5 $\mu$m or less, measured on a fiber that extends 18.9 mm beyond the restraining fixture. All numerical values of fiber bow mentioned herein are measured with apparatus wherein the optical fiber extends 18.9 mm beyond the restraining means.

More specifically, the method according to the invention comprises providing an optical fiber preform, heating the preform with heating means (typically a tubular furnace) having an inner diameter D, and drawing the optical fiber from the heated preform, all in conventional fashion. As the fiber is being drawn from the preform, the fiber is caused to pass through a tubular cooling chamber that extends downward from the furnace.

Significantly, the tubular cooling chamber comprises a length $L_1$ of a tube of relatively small internal diameter $d_1$, with $d_1<D$ and $d_1<35$ mm, with a transition element disposed between the furnace and the tube of internal diameter $d_1$.

Furthermore, the method comprises selecting the cooling chamber such that the cooling chamber has essentially no turbulence-causing air leaks and/or turbulence-causing geometrical internal features. The length of the cooling chamber is selected such that the optical fiber that is being drawn has, at the exit from the cooling chamber, a temperature that is less than or equal to a critical temperature for stress incorporation into the optical fiber. Exemplarily, the fiber temperature at the exit from the cooling chamber is less than 700° C.

In a preferred embodiment, the cooling chamber further comprises a length $L_2$ of a further tube, of diameter $d_2>d_1$ (and typically approximately equal to D), attached to the furnace, with the transition element disposed between the tubes of inner diameters $d_1$ and $d_2$.

The drawings are not to scale and are not in proportion.

Detailed Description

Fiber bow is believed to be caused by "frozen-in" non-uniform stress resulting from preform irregularities and/or uneven cooling during the draw process. Consequently, it is an objective of the inventive method to substantially eliminate uneven cooling of the fiber during the time the fiber is at temperatures at which stress incorporation into the fiber can occur. Exemplarily this temperature range is 700–1200° C.

Figure 1:
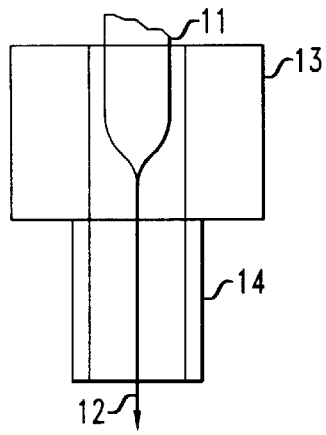
FIG. 1 schematically depicts prior art apparatus for making optical fiber.

FIG. 1 schematically depicts exemplary prior art apparatus, with reference numerals 11–14 referring to a conventional fiber preform, the fiber being drawn from the preform, the furnace, and a cooling chamber. The furnace can be conventional, e.g., a tubular furnace having a 12 inch (305 mm) long, 16 inch (406 mm) diameter water cooled copper shell that surrounds a zirconia heating element or susceptor of about 80 mm inner diameter. The cooling chamber is attached to the bottom of the furnace by any suitable means. The cooling chamber 14 exemplarily is 10 inches (254 mm) long, and consists of a water-cooled stainless steel jacket surrounding a silica tube having 75 mm outside diameter and 70 mm inside diameter.

Fiber drawn at speeds of 15–20 m/s using the apparatus of FIG. 1 had large mean fiber bow, frequently above 20 $\mu$m, and with high standard deviations, typically above 10 $\mu$m. Increasing the length of the cooling chamber while maintaining the inner diameter of 70 mm resulted in some reduction of mean bow and standard deviation, but did not result in significant improvement.

Figure 2:
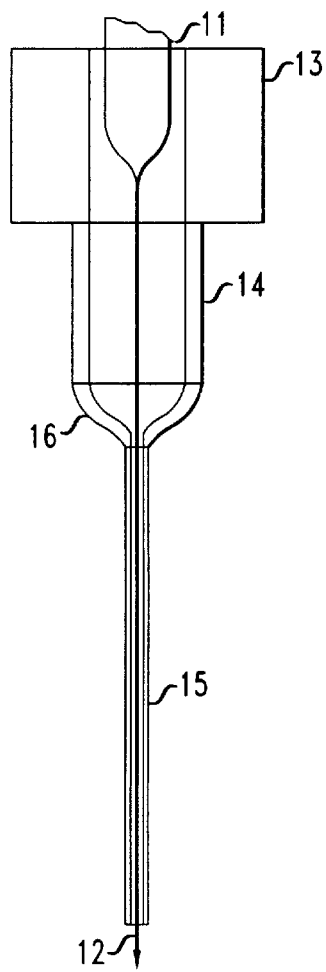
FIG. 2 schematically shows exemplary preferred apparatus for making low bow fiber.

Significant improvement was achieved with preferred apparatus as schematically shown in FIG. 2, namely, cooling means that comprise, in addition to cooling chamber 14, a further tubular cooling chamber 15 and a transition member 16, with the lower cooling chamber selected to have a significantly smaller inner diameter than the upper chamber. The transition member is selected to provide a smooth transition between the internal diameters of the upper and lower chambers.

Figure 4:
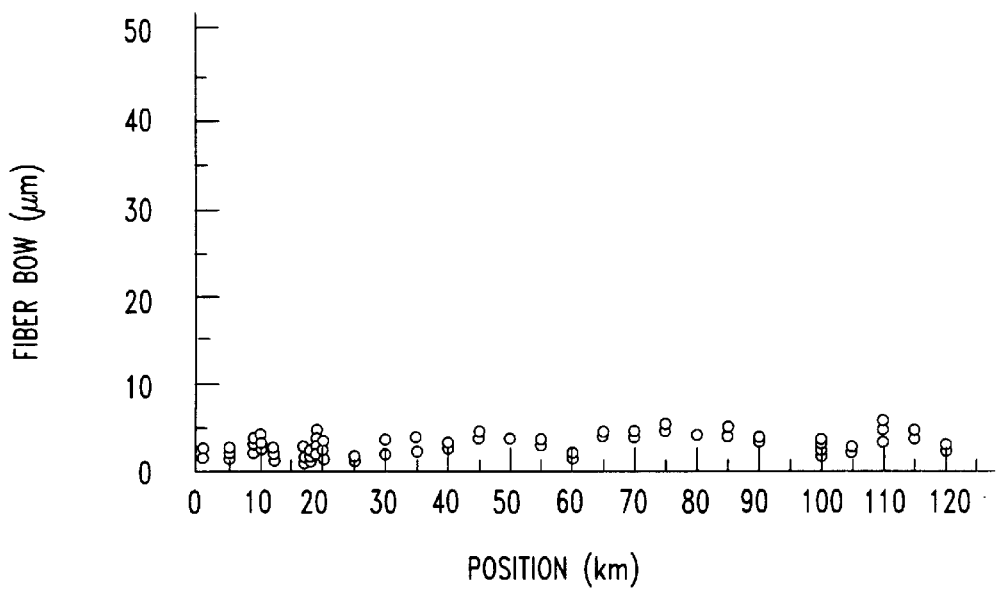
FIG. 4 shows data on bow of fiber produced according to the invention.

In initial experiments the length of the lower cooling chamber was 78 inches (1980 mm), with the inner diameter being 35 mm. This configuration yielded little improvement over the above described prior art apparatus. However, provision of a first cooling chamber with inner diameter less than 35 mm (typically less than 20 mm, exemplarily about 13 mm) resulted in surprising improvement, as can be seen from FIG. 4. The figure shows measured data on fiber bow as a function of position along a fiber made according to the invention, with a 1980 mm long lower cooling chamber with 0.5 inch (12.7 mm) inner diameter, and with a 206 mm long transition element providing a smooth transition between the two cooling chambers. He and $N_2$ optionally was flowed upward through the cooling chamber and into the furnace at a rate of about 8 liter/min. FIG. 4 shows that the 120 km of optical fiber had a mean value of fiber bow of 2.9 μm, with a standard deviation of 0.97 μm.

Available data indicate that a relatively small inner diameter (<35 mm, preferably ≦20 mm) of the lower cooling chamber is an important feature of apparatus for the practice of the invention. The data also indicate that for best results the transition between upper and lower cooling chambers should be a smooth one, the interior of the cooling chamber should be free of turbulence-causing geometrical internal features, and the cooling chamber should be substantially free of air leaks.

Figure 5:
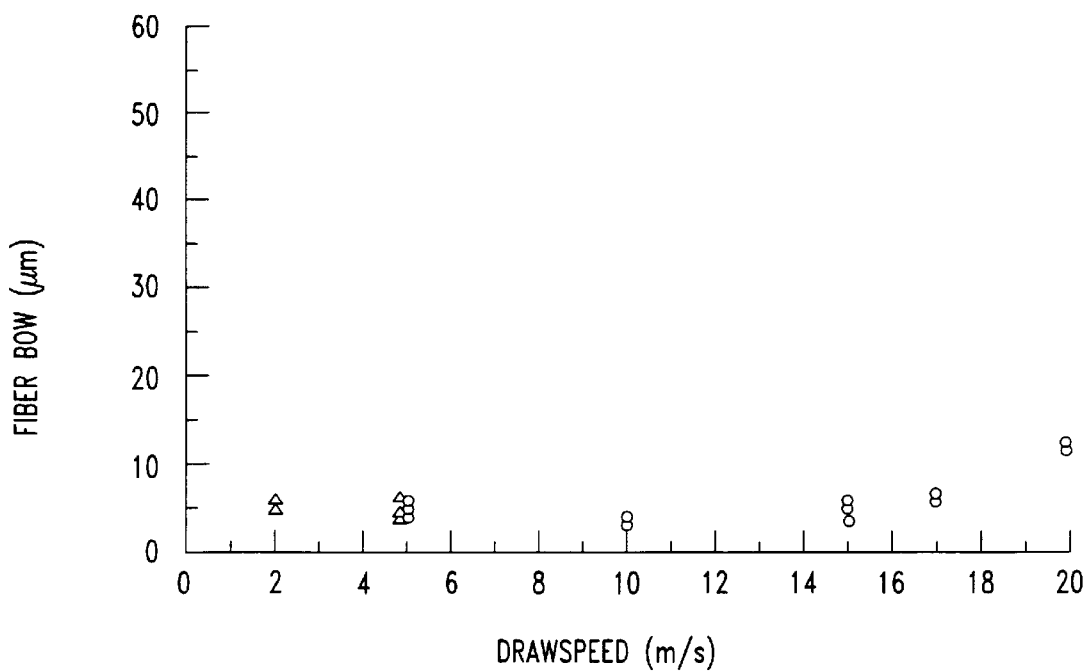
FIG. 5 shows data on mean bow vs. fiber draw speed.

The length of the cooling chamber depends inter alia on the fiber draw speed, with higher speed demanding a longer cooling chamber, such that at the exit from the cooling chamber the fiber temperature is less than or equal to the critical temperature for residual stress incorporation. This is exemplified by FIG. 5, which shows data on bow versus draw speed, fiber drawn on a 20 m and a 9 m draw tower, respectively. In the latter case the lower cooling chamber was only 9 inches (229 mm) long, whereas in the former one the chamber was 1980 mm. As can be seen from FIG. 5, the bow began to increase with draw speed above about 15 m/s, indicating that the fiber exiting the cooling chamber at these speeds is too hot, requiring provision of a lower cooling chamber more than 1980 mm in length.

The appropriate length of the cooling chamber for a given draw speed can be readily determined by routine experimentation, possibly by a simple measurement of the fiber temperature at the exit from the cooling chamber.

Figure 3:
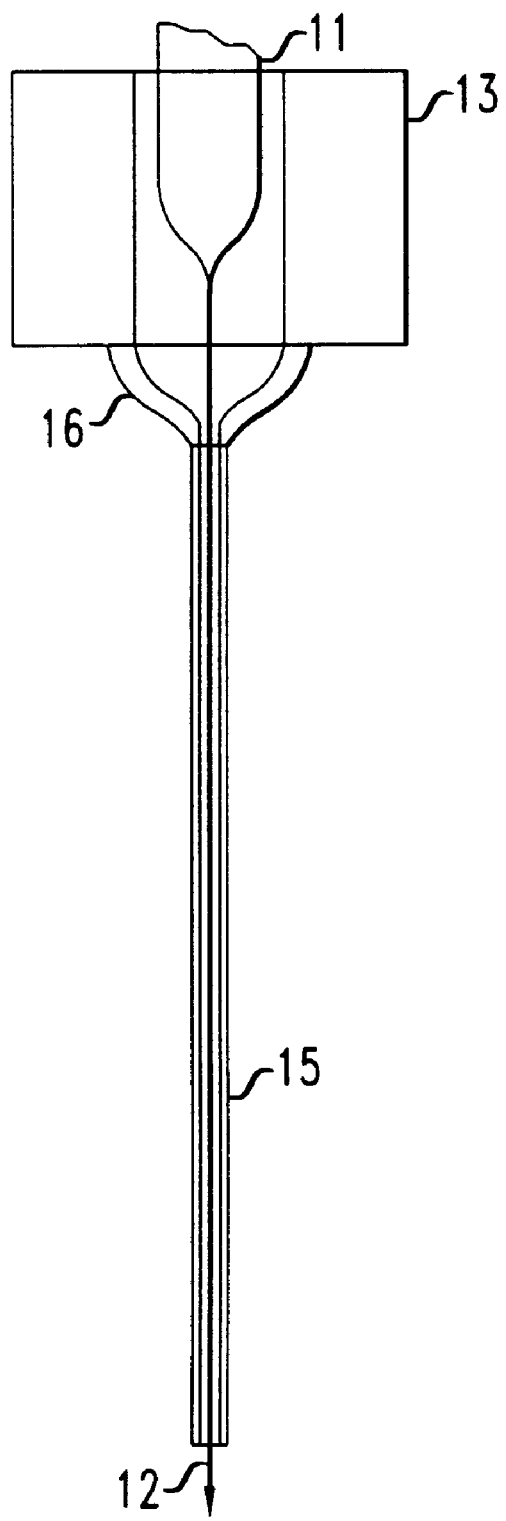
FIG. 3 schematically shows exemplary other, not preferred, apparatus for making low bow fiber.

Those skilled in the art will appreciate that the arrangement of FIG. 2 is exemplary only, and that other arrangements could also be used. For instance, the length and inner diameter of the upper cooling chamber could differ from the disclosed exemplary values, and/or the cooling chamber could have more than two sections, with transition elements between the sections. At least in principle, low bow could be obtained with apparatus that has only a single length of tubular cooling chamber of diameter $d_1 < D$, with a transition element for smooth transition between the furnace opening and the cooling chamber, as is shown schematically in FIG. 3. However, in such an arrangement it would be difficult to provide adequate cooling of the transition element. In view of this difficulty, such an arrangement is not preferred. Furthermore, for the sake of convenience, the tubular chambers can be split longitudinally and hinged together.

The invention claimed is:

1. Method of making an optical fiber comprising a) providing an optical fiber preform;

b) heating the preform in a tubular furnace having an inner diameter D; and c) drawing the optical fiber from the heated preform, with the optical fiber being caused to pass through a tubular cooling chamber extending downward from the tubular furnace;

CHARACTERIZED IN THAT d) the cooling chamber is selected to have essentially no turbulence-causing air leaks and essentially no turbulence-causing internal geometrical features; and e) the cooling chamber comprises a length $L_1$ of a tubular member having inner diameter $d_1 < D$ and $d_1 < 35$ mm, with a transition member disposed between the furnace and the tubular member.

2. The method of claim 1, wherein $d_1$ is less than 20 mm.

3. The method of claim 1, wherein $d_1$ and $L_1$ are selected such that the optical fiber has, after cooling to room temperature, a mean fiber bow $<_5$ μm, as measured on optical fiber that extends 18.9 mm beyond a fiber restraining fixture.

4. The method of claim 3, wherein $d_1$ and $L_1$ furthermore are selected such that the optical fiber has, after cooling to room temperature, a standard deviation of fiber bows of at most 2 μm, as measured on optical fiber that extends 18.9 mm beyond the fiber restraining fixture.

5. The method of claim 1, wherein the cooling chamber further comprises a length $L_2$ of a tubular member of inner diameter $d_2 > d_1$, with the transition member disposed between the tubular member of inner diameter $d_1$ and the tubular member of inner diameter $d_2$, and the tubular member of inner diameter $d_2$ is disposed between the tubular furnace and the transition member.

6. The method of claim 5, wherein $d_2$ is approximately equal to D.

7. The method of claim 5, wherein the cooling chamber is selected to provide, at an exit from the cooling chamber, optical fiber of temperature less than or equal to 700° C.

8. The method of claim 5, wherein $d_1$ is less than 20 mm, $d_2$ is approximately equal to D, and $L_1 > L_2$.

9. The method of claim 8, wherein $d_1$, $d_2$, $L_1$ and $L_2$ are selected such that the optical fiber has, after cooling to room temperature, a mean fiber bow <5 μm and a standard deviation of the fiber bow of at most 2 μm, as measured on optical fiber that extends 18.9 mm beyond a fiber restraining feature.

* * * * *